United States Patent
Spreitzer et al.

(10) Patent No.: US 7,959,114 B2
(45) Date of Patent: Jun. 14, 2011

(54) HOLDER FOR A PIPELINE

(75) Inventors: Volker Spreitzer, Raunheim (DE); Volker Minnert, Wöllstadt (DE)

(73) Assignee: ContiTech Techno-Chemie GmbH, Karben (DE)

( * ) Notice: Subject to any disclaimer, the term of this patent is extended or adjusted under 35 U.S.C. 154(b) by 0 days.

(21) Appl. No.: 12/292,644

(22) Filed: Nov. 24, 2008

(65) Prior Publication Data

US 2009/0078831 A1     Mar. 26, 2009

Related U.S. Application Data

(63) Continuation of application No. PCT/EP2007/053605, filed on Apr. 13, 2007.

(30) Foreign Application Priority Data

Jun. 2, 2006   (DE) .................. 10 2006 025 793

(51) Int. Cl.
*F16L 3/12*        (2006.01)

(52) U.S. Cl. ........... 248/62; 248/65; 248/74.2; 248/74.3

(58) Field of Classification Search ............ 248/62, 248/65, 74.1, 74.2, 74.4
See application file for complete search history.

(56) References Cited

U.S. PATENT DOCUMENTS

| | | | | |
|---|---|---|---|---|
| 3,144,695 | A | | 8/1964 | Budwig |
| 3,513,508 | A | | 5/1970 | Modémé |
| 4,286,444 | A | * | 9/1981 | Grudich ............................ 70/13 |
| 4,360,178 | A | * | 11/1982 | Senter et al. .................. 248/74.1 |
| 4,936,530 | A | | 6/1990 | Wollar |
| 5,755,225 | A | * | 5/1998 | Hutson ..................... 128/207.18 |
| 6,138,972 | A | * | 10/2000 | Votruba ........................ 248/317 |
| 6,443,403 | B1 | | 9/2002 | Page et al. |
| 7,290,805 | B2 | * | 11/2007 | Wu ............................... 285/365 |
| 7,413,561 | B2 | * | 8/2008 | Raulerson et al. ............. 604/174 |
| 2005/0075550 | A1 | * | 4/2005 | Lindekugel ................... 600/344 |
| 2005/0224677 | A1 | | 10/2005 | Zeuner et al. |
| 2006/0027721 | A1 | * | 2/2006 | Tamm et al. ............. 248/229.11 |
| 2006/0204198 | A1 | * | 9/2006 | Michiels ....................... 385/135 |
| 2009/0266945 | A1 | * | 10/2009 | Dietrich et al. .............. 248/74.2 |

FOREIGN PATENT DOCUMENTS

| | | |
|---|---|---|
| BE | 648 275 | 9/1964 |
| DE | 79 13 497 | 4/1980 |
| EP | 1 158 233 | 11/2001 |
| LU | 58694 | 8/1969 |

* cited by examiner

*Primary Examiner* — Terrell Mckinnon
*Assistant Examiner* — Steven M Marsh
(74) *Attorney, Agent, or Firm* — Walter Ottesen

(57) ABSTRACT

The invention relates to a holder (2) for a pipeline segment (1) which takes the form of a clamp (3, 4, 5) with at least two ends. The clamp fits around the pipeline segment (1) and is firmly attached thereto. At least two of the ends of the clamp, which is fitted around the pipeline under tensile stress, are firmly and permanently connected to each other with the aid of at least one clinching connection.

14 Claims, 2 Drawing Sheets

HOLDER FOR A PIPELINE

CROSS REFERENCE TO RELATED APPLICATIONS

This application is a continuation application of international patent application PCT/EP 2007/053605, filed Apr. 13, 2007, designating the United States and claiming priority from German application 10 2006 025 793.6, filed Jun. 2, 2006, and the entire content of both applications is incorporated herein by reference.

FIELD OF THE INVENTION

The invention relates to a holder for a pipeline which engages around the pipeline as a clamp comprising at least two ends and is unreleasably arranged on the pipeline.

BACKGROUND OF THE INVENTION

Such holders have been used for a long time in many different forms. In this connection, the clamps are, for example, welded or soldered together at the ends. Thermal connecting methods are, however, not particularly suitable as connecting methods for different materials or materials having a surface coating.

United States patent publication 2005/0224677 discloses a holder which, by means of a folding mechanism, engages around one cable or a plurality of cables, and can be closed with a snap connection. However, due to the design for a plurality of cables, this holder is not suitable for securing pipelines against torsion or axial displacement in the event of greater forces.

In U.S. Pat. No. 6,443,403, a holder is shown wherein the two ends thereof are connected to one another by a rivet-like latching pin. The connection is based on the resilience of the elastic detents of the latching pin. After the latching pin is forced into a hole, the elastic detents snap open behind corresponding detent notches and thus an unreleasable connection of the ends of the clamp is formed.

A drawback with this arrangement is that an additional component is required and that such a connection is associated with play. A fixed clamping of the clamp to the pipe is, therefore, only possible for low displacement forces or torques.

SUMMARY OF THE INVENTION

It is an object of the invention to provide a holder of the kind referred to above which, without thermal connecting methods, ensures the unreleasable fixing of the holder on the pipeline, even for greater displacement forces and torques.

This object is achieved in that the at least two ends of the clamp passed around the pipeline under tensile stress are fixedly and unreleasably connected to one another by at least one clinching connection.

Such a clinching connection is an unreleasable connection which has a high degree of strength. It also allows the connection of different types of materials or surface-coated materials without the coating being damaged at the same time. Such a clinching connection connects the two ends of the clamp without play and therefore makes it possible that the tension in the clamp which is applied during installation is Maintained during the operation of the holder. For this reason, a high resistance is provided between the holder and the pipeline against axial displacement or torsion.

In a further embodiment of the invention, the clamp of the holder comprises two holding elements, each at least partially engaging around the pipeline. The holding elements are connected to one another by an articulated connection at their respective first ends. The opposite-lying ends are fixedly and unreleasably connected to one another by at least one clinching connection, such that the pipeline can be clamped fixedly so that the pipeline cannot rotate and axially displace relative to the holding elements.

In another embodiment of the invention, the holding elements may be released from one another at the articulated connection.

In still another embodiment of the invention, the holding elements are unreleasably connected to one another at the articulated connection.

The design of the clamp, which is made up of two elements which are connected by an articulated connection, has the advantage that the holder can easily be adapted to many different types of geometry. Depending on the application and the accessibility of the location at which the holder is intended to be mounted, it can be advantageous, on the one hand, to assemble the clamp, which is made up of two elements which are releasable from one another, only in situ during the installation of the pipeline, and, on the other hand, an unreleasable articulated connection provides the advantage that, even during installation, the holding elements cannot fall apart at locations which are difficult to access.

Moreover, the two-part nature of the clamp has, in combination with the clinching connection, the advantage that a selection of different materials or surface coatings suitable for the application is also possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
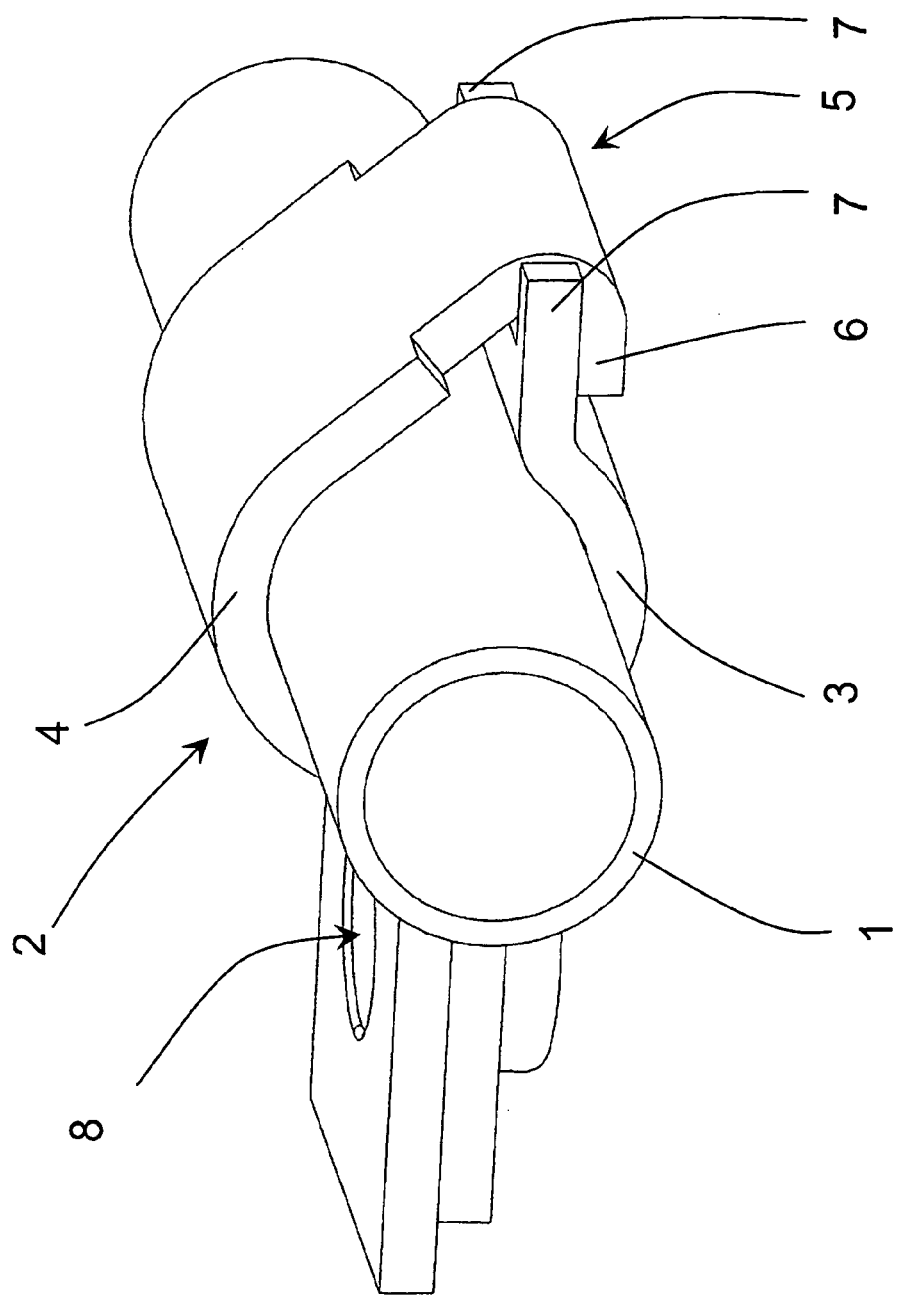
FIG. 1 shows a perspective view of an arrangement of the holder according to the invention on a pipeline segment; and, FIG. 2 shows a section through the arrangement according to the invention.

In FIG. 1, a pipeline segment 1 is shown which has a holder 2 according to the invention. The holder 2 has a first holding element 3 and a second holding element 4. As shown in the drawing, the holding element 3 is passed around the pipeline 1 from below and the holding element 4 is passed around the pipeline 1 from above. At one end, the holding elements 3 and 4 engage with each other with an articulated or hinge-like connection 5, in which a hook-shaped portion 6 of the upper holding element 4 grips below the lower holding element 3. Lateral slipping of the holding elements 3 and 4 in the articulated connection 5 is prevented by two limit stops 7.

At the opposite-lying ends of the holding elements 3 and 4, the holding elements 3 and 4 are fixedly connected to one another by means of a clinching connection 8.

Figure 2:
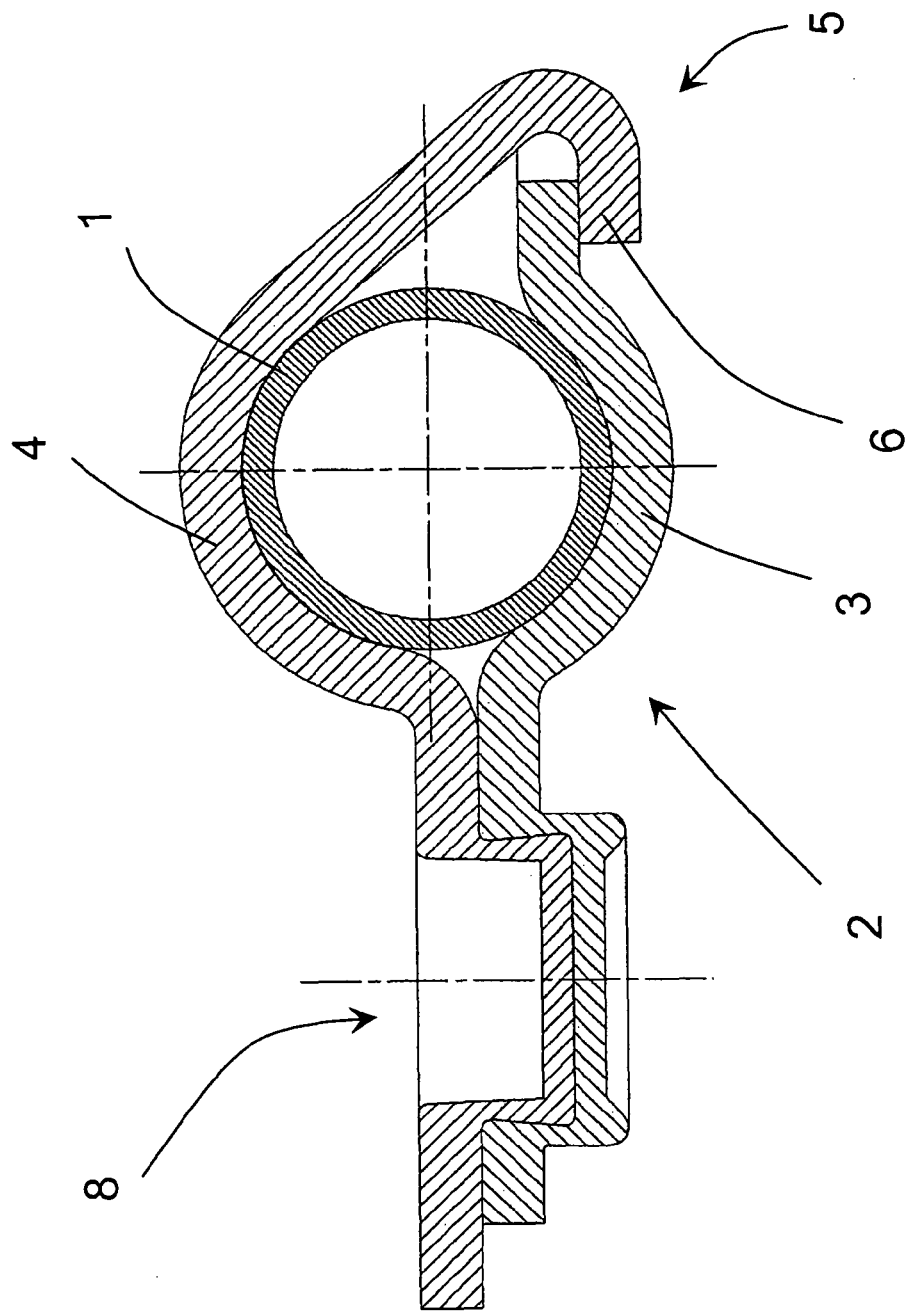

In FIG. 2, a section is shown through the arrangement according to the invention. It can be seen that the holding elements 3 and 4 at the end of the articulated connection 5 are releasably connected to one another. This is so because the hook-shaped portion 6 is not connected unreleasably to the lower holding element 3 by a material connection, by bonding or otherwise. The connection is exclusively form tight. This makes it possible to position the holding elements 3 and 4 independently of one another around the pipeline 1 and to create the articulated connection 5 only in situ.

At the opposite-lying end, the lower holding element 3 and the upper holding element are fixedly connected by the clinching connection 8. A clamping tension may be applied between the lower holding element 3 and the upper holding element 4 during installation. As a result, the pipeline segment 1 can be clamped tightly between the holding elements 3 and 4. The clinching connection 8 has a strength which maintains the clamping tension between the lower holding element 3 and the upper holding element 4, even after the installation of the holder 2.

The clinching connection 8 is both a form-tight and force-tight connection. The principle of operation of a clinching connection is known from the prior art and is therefore not described in more detail here. It is clear, however, that no play is present between the lower holding element 3 and the upper holding element 4 in the region of the clinching connection 8. The same applies also for the clamping of the pipeline segment 1 between the lower holding element 3 and the upper holding element 4. As a result, between the pipeline segment 1 and the holding elements 3 and 4, a high resistance is provided against twisting or axial displacement of the holder 2 with respect to the pipeline segment 1.

It is understood that the foregoing description is that of the preferred embodiments of the invention and that various changes and modifications may be made thereto without departing from the spirit and scope of the invention as defined in the appended claims.

LIST OF REFERENCE NUMERALS

Part of the Description

1 Pipeline segment
2 Holder
3 First holding element
4 Second holding element
5 Articulated connection
6 Hook-shaped portion of the first holding element 3
7 Limit stops
8 Clinching connection

What is claimed is:

1. A holder for a pipeline, the holder comprising:
first and second clamp members having respective first ends conjointly defining a connection connecting said first ends to each other;
said first and second clamp members grasping said pipeline therebetween while under a clamping tension;
said first and second clamp members having respective second ends conjointly defining an interface;
said interface and said connection being on mutually opposite sides of said pipeline; and,
said second ends being fixedly connected together with a permanent mechanical interlock wherein said second ends are plastically deformed to mutually interengage at said interface so as to maintain said clamping tension during the service life of said holder.

2. The holder of claim 1, wherein said connection is an articulated or hinge-like connection connecting said first ends to each other.

3. The holder of claim 2, said first and second clamp members defining first and second holding elements each grasping partially about said pipeline; and, permanent mechanical interlock so connecting said second ends tightly to each other that said pipeline is clamped between said holding elements so that said pipeline cannot rotate or shift axially relative to said holding elements.

4. The holder of claim 3, wherein said holding elements are releasable from each other at said articulated or hinge-like connection.

5. The holder of claim 2, wherein said first end of said first clamp member is bent over to form a hook and said first end of said second clamp member has a flat end engaging into said hook.

6. The holder of claim 5, wherein said flat end has two limit stops for engaging about said hook to prevent a lateral shift of said first and second clamp members relative to each other.

7. The holder of claim 1, wherein said first clamp member is made of a first material and said second clamp member is made of a second material different from said first material.

8. A two-member holder for a pipeline, the two-member holder consisting of:
first and second clamp members having respective first ends conjointly defining a connection connecting said first ends to each other;
said first and second clamp members grasping said pipeline therebetween while under a clamping tension;
said first and second clamp members having respective second ends conjointly defining an interface;
said interface and said connection being on mutually opposite sides of said pipeline; and,
said second ends being fixedly connected together with a permanent mechanical interlock wherein said second ends are plastically deformed to mutually interengage at said interface so as to maintain said clamping tension during the service life of said two-member holder.

9. The two-member holder of claim 8, wherein said connection is an articulated or hinge-like connection connecting said first ends to each other.

10. The two-member holder of claim 9, said first and second clamp members defining first and second holding elements each grasping partially about said pipeline; and, permanent mechanical interlock so connecting said second ends tightly to each other that said pipeline is clamped between said holding elements so that said pipeline cannot rotate or shift axially relative to said holding elements.

11. The two-member holder of claim 10, wherein said holding elements are releasable from each other at said articulated or hinge-like connection.

12. The two-member holder of claim 9, wherein said first end of said first clamp member is bent over to form a hook and said first end of said second clamp member has a flat end engaging into said hook.

13. The two-member holder of claim 12, wherein said flat end has two limit stops for engaging about said hook to prevent a lateral shift of said first and second clamp members relative to each other.

14. The two-member holder of claim 8, wherein said first clamp member is made of a first material and said second clamp member is made of a second material different from said first material.

\* \* \* \* \*

UNITED STATES PATENT AND TRADEMARK OFFICE
CERTIFICATE OF CORRECTION

Page 1 of 1

PATENT NO. : 7,959,114 B2
APPLICATION NO. : 12/292644
DATED : June 14, 2011
INVENTOR(S) : Volker Spreitzer and Volker Minnert It is certified that error appears in the above-identified patent and that said Letters Patent is hereby corrected as shown below:

In column 1:
Line 65: delete "Maintained" and substitute -- maintained -- therefor.

In column 4:
Line 1: insert -- said -- before "permanent".
Line 41: insert -- said -- before "per-".

Signed and Sealed this
Twenty-seventh Day of September, 2011

David J. Kappos
*Director of the United States Patent and Trademark Office*